US009582990B2

(12) United States Patent
Peng

(10) Patent No.: US 9,582,990 B2
(45) Date of Patent: Feb. 28, 2017

(54) HANDHELD ELECTRONIC APPARATUS, REMOTE CONTROL METHOD, HOME APPLIANCE SYSTEM AND HOME APPLIANCE APPARATUS

(71) Applicant: Wistron Corporation, New Taipei (TW)

(72) Inventor: Chang-Chung Peng, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 192 days.

(21) Appl. No.: 14/481,948

(22) Filed: Sep. 10, 2014

(65) Prior Publication Data

US 2015/0194051 A1 Jul. 9, 2015

(30) Foreign Application Priority Data

Jan. 29, 2014 (TW) ............................ 103103391 A

(51) Int. Cl.
*G05B 11/01* (2006.01)
*G08C 17/02* (2006.01)

(52) U.S. Cl.
CPC ......... *G08C 17/02* (2013.01); *G08C 2201/20* (2013.01); *G08C 2201/71* (2013.01)

(58) Field of Classification Search
CPC .................................. G06F 9/00; G08C 17/02
(Continued)

(56) References Cited

U.S. PATENT DOCUMENTS 5,362,069 A * 11/1994 Hall-Tipping ..... A63B 24/0087 273/148 B
8,537,286 B2 9/2013 Bae
(Continued)

FOREIGN PATENT DOCUMENTS

| | | |
|---|---|---|
| TW | 200939690 A | 9/2009 |
| TW | 201216090 A | 4/2012 |
| TW | 201322650 A | 6/2013 |

OTHER PUBLICATIONS

TW Office Action dated Sep. 17, 2015 in corresponding Taiwan application (No. 103103391).
(Continued)

*Primary Examiner* — Vernal Brown
(74) *Attorney, Agent, or Firm* — McClure, Qualey & Rodack, LLP

(57) ABSTRACT

A handheld electronic apparatus, a remote control method, a home appliance system and a home appliance apparatus are disclosed. The handheld electronic apparatus comprises a network module, an orientation sensor, a touch display and a processor. The network module receives a broadcast packet, which comprises a home appliance orientation and a controllable function of the home appliance apparatus and is outputted from the home appliance apparatus. The orientation sensor provides the remote control orientation of the handheld electronic apparatus. The processor relates the controllable function to a touch gesture of the touch display, and determines whether the home appliance apparatus is a controlled apparatus according to the home appliance orientation and the remote control orientation. When the home appliance apparatus is the controlled apparatus, and the touch display receives the touch gesture, the remote control home appliance apparatus executes the controllable function.

19 Claims, 4 Drawing Sheets

(58) Field of Classification Search
USPC ........................................................ 340/12.54
See application file for complete search history.

(56) References Cited

U.S. PATENT DOCUMENTS

| | | | | |
|---|---|---|---|---|
| 8,634,848 | B1 * | 1/2014 | Bozarth | H04W 64/00 455/41.2 |
| 9,071,862 | B2 | 6/2015 | Chen et al. | |
| 2013/0137466 | A1 | 5/2013 | Chen et al. | |

OTHER PUBLICATIONS

English translation of TW Office Action dated Sep. 17, 2015 in corresponding Taiwan application (No. 103103391).

* cited by examiner

1

5

HANDHELD ELECTRONIC APPARATUS, REMOTE CONTROL METHOD, HOME APPLIANCE SYSTEM AND HOME APPLIANCE APPARATUS

This application claims the benefit of Taiwan application Serial No. 103103391, filed Jan. 29, 2014, the subject matter of which is incorporated herein by reference.

BACKGROUND OF THE INVENTION

Field of the Invention

The invention relates to an electronic apparatus, and more particularly to a handheld electronic apparatus, a remote control method, a home appliance system and a home appliance apparatus.

Description of the Related Art

In order to enhance the convenience of operating the home appliances, remote controllers are utilized to operate more and more home appliances in the daily life. Consequently, the applications of various home appliances become more convenient, and the configurations of the home appliances become more flexible without the consideration of the problem of the users manual operations. However, in order to prevent the remote controllers from interfering with each other, each home appliance corresponds to an independent remote controller. In this manner, the users have to carry multiple remote controllers and remember the function operations between the remote controllers and the corresponding apparatuses.

SUMMARY OF THE INVENTION

The invention is directed to a handheld electronic apparatus, a remote control method, a home appliance system and a home appliance apparatus.

According to a first aspect of the present invention, a handheld electronic apparatus is provided. The handheld electronic apparatus comprises a network module, an orientation sensor, a touch display and a processor. The network module receives a broadcast packet, which is outputted from a first home appliance apparatus and comprises a first home appliance orientation and a controllable function of the first home appliance apparatus. The orientation sensor provides a remote control orientation of the handheld electronic apparatus. The processor relates the controllable function to a touch gesture of the touch display and determines whether the first home appliance apparatus is a controlled apparatus according to the first home appliance orientation and the remote control orientation. When the first home appliance apparatus is the controlled apparatus and the touch display receives the touch gesture, the first home appliance apparatus is remotely controlled to execute the controllable function.

According to a second aspect of the present invention, a remote control method is provided. The remote control method is used in a handheld electronic apparatus to remotely control a first home appliance apparatus. The handheld electronic apparatus comprises a touch display. The remote control method comprises: receiving a broadcast packet, which is outputted from the first home appliance apparatus and comprises a first home appliance orientation and a controllable function of the first home appliance apparatus; relating the controllable function to a touch gesture of the touch display; and determining whether the first home appliance apparatus is a controlled apparatus according to the first home appliance orientation and a remote control orientation of the handheld electronic apparatus. When the first home appliance apparatus is the controlled apparatus and the touch display receives the touch gesture, the first home appliance apparatus is remotely controlled to execute the controllable function.

According to a third aspect of the present invention, a home appliance system is provided. The home appliance system comprises a home appliance apparatus and a handheld electronic apparatus. The home appliance apparatus comprises a home appliance body, a first orientation sensor, a first processor and a first network module. The handheld electronic apparatus comprises a second network module, a second orientation sensor, a touch display and a second processor. The home appliance body has a controllable function. The first orientation sensor provides a first home appliance orientation of the home appliance apparatus. The first processor generates a broadcast packet according to the controllable function and the first home appliance orientation. The first network module transmits the broadcast packet. The second network module receives the broadcast packet. The second orientation sensor provides the remote control orientation of the handheld electronic apparatus. The second processor relates the controllable function to a touch gesture of the touch display, and determines whether the home appliance apparatus is a controlled apparatus according to the home appliance orientation and the remote control orientation. When the home appliance apparatus is the controlled apparatus and the touch display receives the touch gesture, the home appliance body is remotely controlled to execute the controllable function.

According to a fourth aspect of the present invention, a home appliance apparatus is provided. The home appliance apparatus comprises a home appliance body, an orientation sensor, a processor and a network module. The home appliance body has a controllable function. The orientation sensor provides a home appliance orientation of the home appliance apparatus. The processor generates a broadcast packet according to the controllable function and the home appliance orientation. The network module transmits the broadcast packet to a handheld electronic apparatus, so that the handheld electronic apparatus remotely controls the home appliance body to execute the controllable function.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
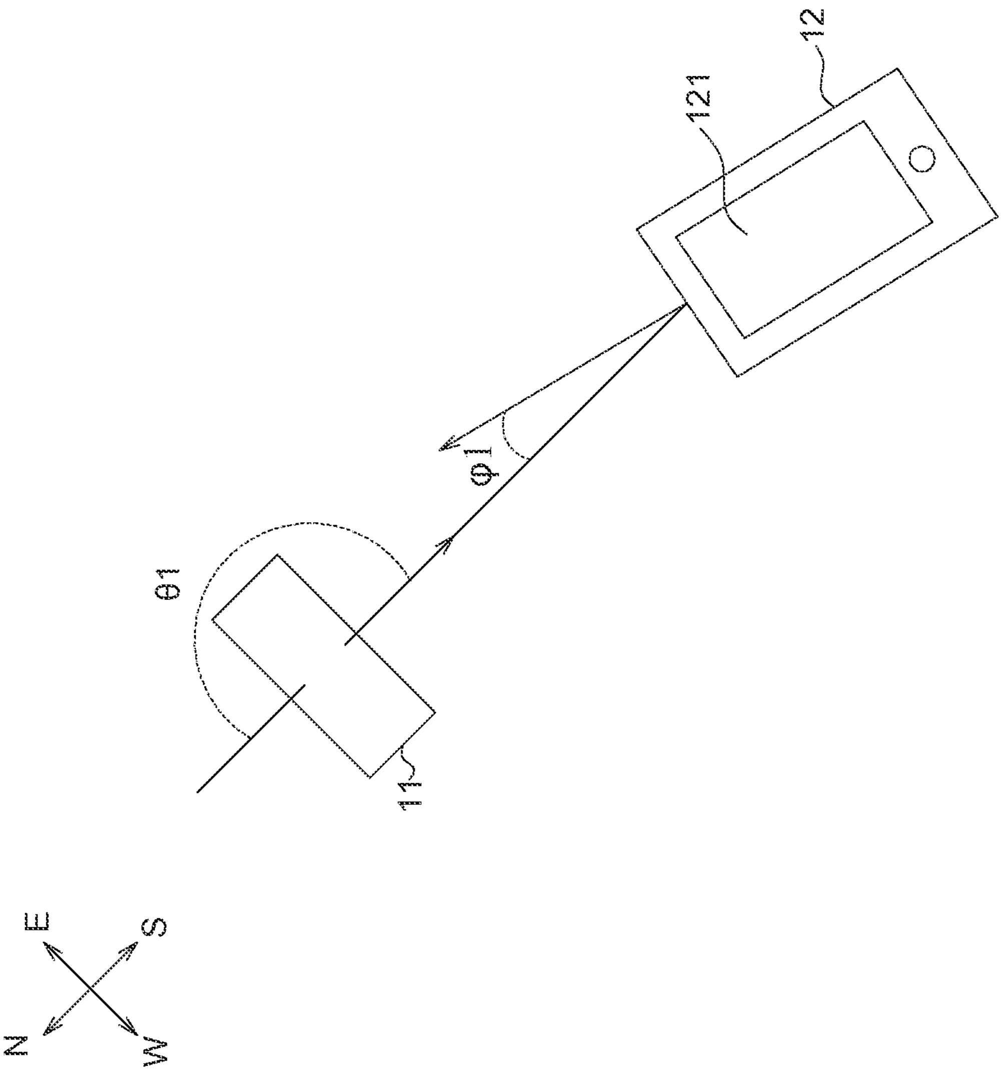
FIG. 1 is a schematic view showing a home appliance system according to a first embodiment.
Figure 2:
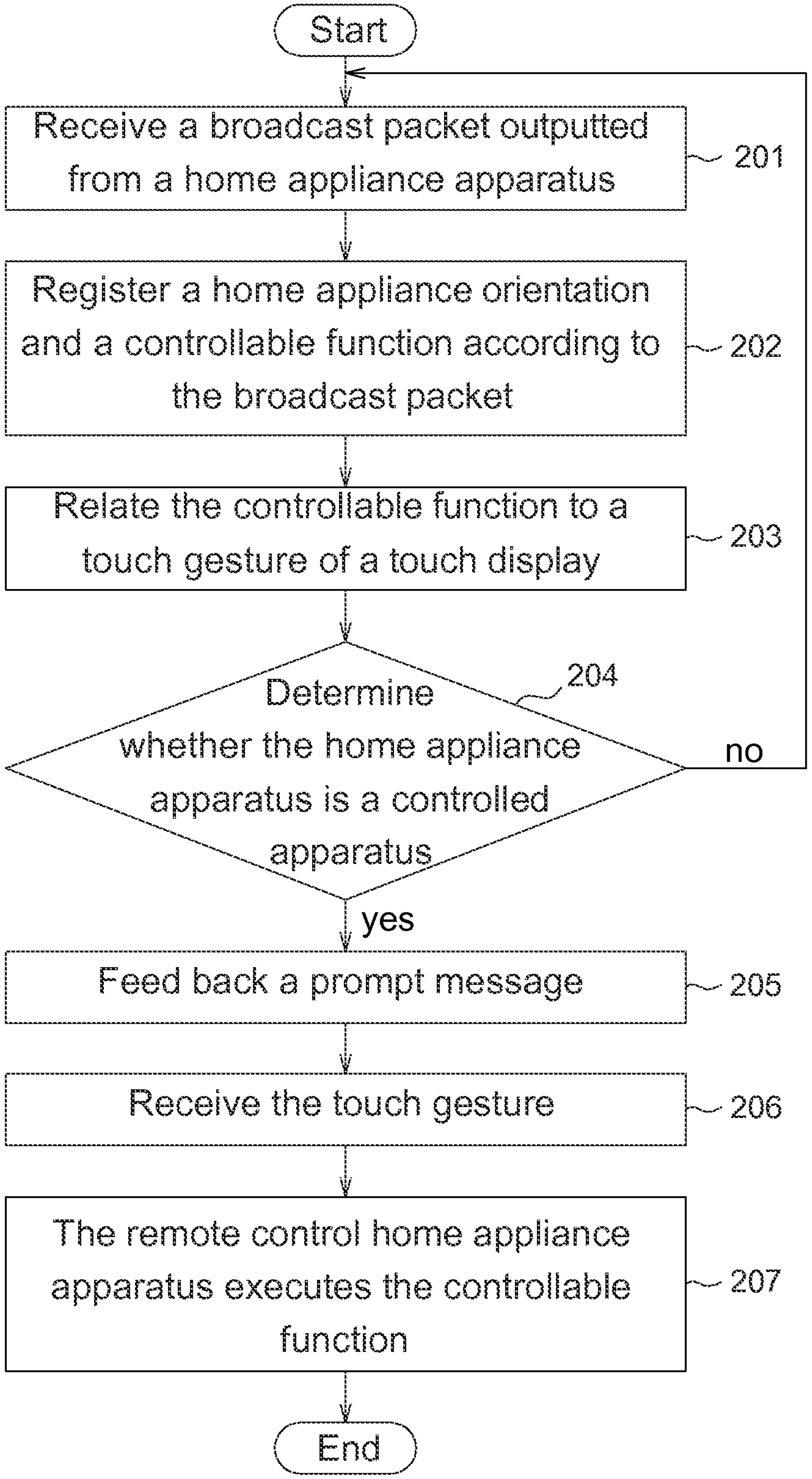
FIG. 2 is a flow chart showing a remote control method according to the first embodiment.

FIG. 1 is a schematic view showing a home appliance system 1 according to a first embodiment. FIG. 2 is a flow chart showing a remote control method according to the first embodiment. Referring to FIGS. 1 and 2, the home appliance system 1 comprises a home appliance apparatus 11 and a handheld electronic apparatus 12. The home appliance apparatus 11 is, for example, a television, an air conditioner, a sounder or the like, and the handheld electronic apparatus 12 is, for example, a mobile phone. The remote control method is used in the handheld electronic apparatus 12 to remotely control the home appliance apparatus 11, and comprises the following steps. First, as shown in step 201, the handheld electronic apparatus 12 receives a broadcast packet, which is outputted from the home appliance apparatus 11 and comprises a home appliance orientation and a controllable function of the home appliance apparatus 11. The controllable function changes according to the kind of the home appliance apparatus 11. For example, if the home appliance apparatus 11 is the television, then the controllable function comprises a power switch, volume adjustment, channel selection and the like. If the home appliance apparatus 11 is the air conditioner, then the controllable function comprises a power switch, temperature adjustment, sleep mode selection and the like. If the home appliance apparatus 11 is the sounder, then the controllable function comprises a power switch, play, stop, pause, selection of a previous track, selection of a next track and the like.

After the handheld electronic apparatus 12 receives the broadcast packet, step 202 is executed. As shown in the step 202, the handheld electronic apparatus 12 registers a home appliance orientation and a controllable function according to the broadcast packet. In other words, the handheld electronic apparatus 12 records the home appliance orientation and the controllable function of the home appliance apparatus 11 according to the broadcast packet. Then, as shown in step 203, the handheld electronic apparatus 12 relates the controllable function to a touch gesture of a touch display 121. For example, the touch gesture corresponding to power-on is to draw a circle on the touch display; the touch gesture corresponding to power-off is to draw “X” on the touch display; the touch gesture corresponding to the volume adjustment is to drag and slide leftward and rightward on the touch display; the channel selection is to drag and slide upward and downward on the touch display.

After the correlation between the controllable function and the touch gesture has been established, step 204 is executed. As shown in the step 204, the handheld electronic apparatus 12 determines whether the home appliance apparatus 11 is a controlled apparatus. Furthermore, the handheld electronic apparatus 12 determines whether the home appliance apparatus 11 is the controlled apparatus according to the home appliance orientation $\theta 1$ and the remote control orientation $\phi 1$ of the handheld electronic apparatus 12. The handheld electronic apparatus 12 calculates an angle difference $\Delta\theta 1$ between the home appliance orientation $\theta 1$ and the remote control orientation $\phi 1$, and determines whether the angle difference $\Delta\theta 1$ falls within a tolerance range. When the angle difference $\Delta\theta 1$ falls within the tolerance range, the home appliance apparatus 11 is the controlled apparatus.

When the home appliance apparatus 11 is the controlled apparatus, step 205 is executed. As shown in the step 205, the handheld electronic apparatus 12 feeds back a prompt message. The prompt message is, for example, sound or vibration for notifying the user that the home appliance apparatus 11 directed to the handheld electronic apparatus is the controlled apparatus. The user can input the touch gesture to the touch display 121 according to the to-be-executed controllable function. Next, as shown in step 206, the touch display 121 receives the touch gesture. Then, as shown in step 207, the handheld electronic apparatus 12 remotely controls the home appliance apparatus 11 to execute the controllable function according to the touch gesture. Because the controllable function relates to the touch gesture, the handheld electronic apparatus 12 needs not to additionally display button frames to be clicked by the user. The user can directly input the touch gesture to the touch display 121 to remotely control the home appliance apparatus without watching the display frame. Consequently, the operation convenience will be enhanced.

Figure 3:
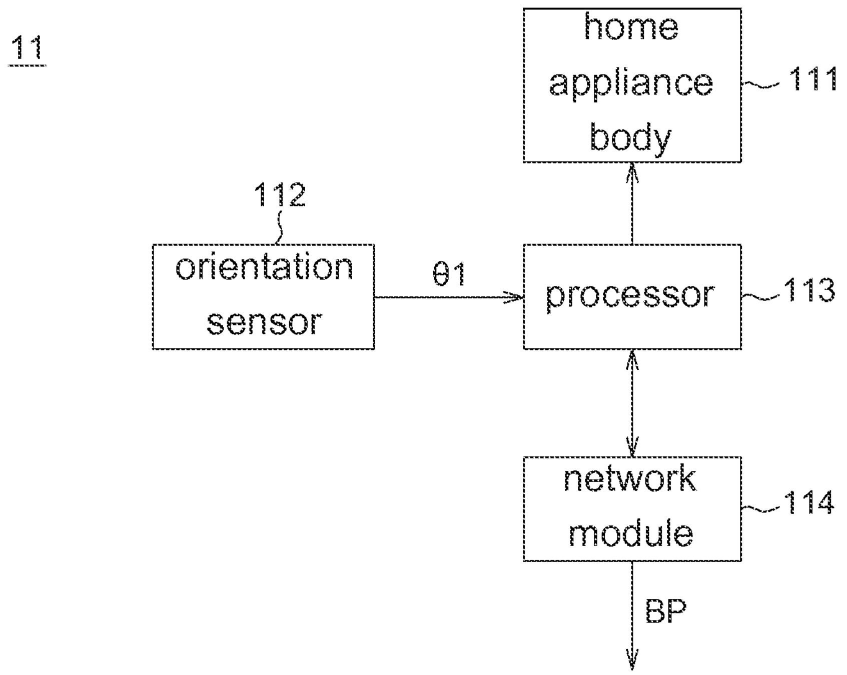
FIG. 3 is a block diagram showing a home appliance apparatus according to the first embodiment.
Figure 4:
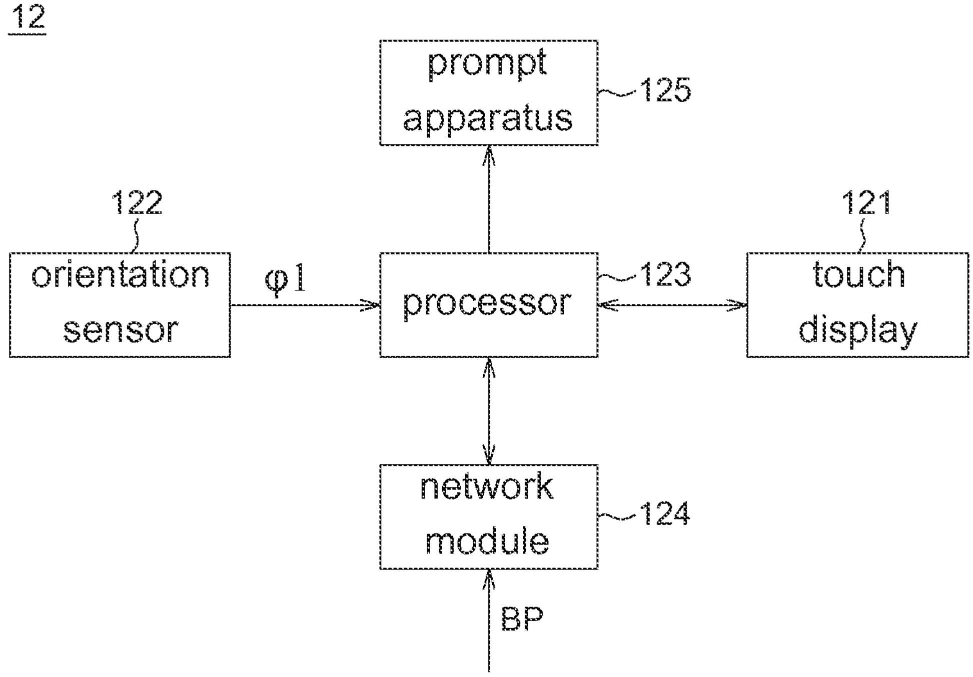
FIG. 4 is a block diagram showing a handheld electronic apparatus according to the first embodiment.

FIG. 3 is a block diagram showing a home appliance apparatus according to the first embodiment. FIG. 4 is a block diagram showing a handheld electronic apparatus according to the first embodiment. Referring to FIGS. 3 and 4 concurrently, the home appliance apparatus 11 further comprises a home appliance body 111, an orientation sensor 112, a processor 113 and a network module 114, and the handheld electronic apparatus 12 comprises the touch display 121, an orientation sensor 122, a processor 123, a network module 124 and a prompt apparatus 125. Each of the orientation sensor 112 and the orientation sensor 122 is, for example, an electronic compass.

The home appliance body 111 has the controllable function, which changes according to the kind of the home appliance apparatus 11. The orientation sensor 112 provides a home appliance orientation $\theta 1$ of the home appliance apparatus 11. The processor 113 generates a broadcast packet BP according to the controllable function and the home appliance orientation $\theta 1$. The network module 114 transmits the broadcast packet BP by way of broadcasting.

The network module 124 receives the broadcast packet BP broadcasted by the home appliance apparatus 11. The orientation sensor 122 provides the remote control orientation $\phi 1$ of the handheld electronic apparatus 12. The processor 123 relates the controllable function to the touch gesture of the touch display 121, and determines whether the home appliance apparatus 11 is the controlled apparatus according to the home appliance orientation $\theta 1$ and the remote control orientation $\phi 1$. When the home appliance apparatus 11 is the controlled apparatus and the touch display 121 receives the touch gesture, the home appliance body 111 is remotely controlled to execute the controllable function.

Furthermore, the processor 123 registers the home appliance orientation $\theta 1$ of the home appliance apparatus 11 and the controllable function according to the broadcast packet BP. The processor 123 calculates the angle difference $\Delta\theta 1$ between the home appliance orientation $\theta 1$ and the remote control orientation $\phi 1$, and determines whether the angle difference $\Delta\theta 1$ falls within the tolerance range. When the angle difference $\Delta\theta 1$ falls within the tolerance range, the home appliance apparatus 11 is the controlled apparatus, and the prompt apparatus 125 feeds back the prompt message.

Second Embodiment

Figure 5:
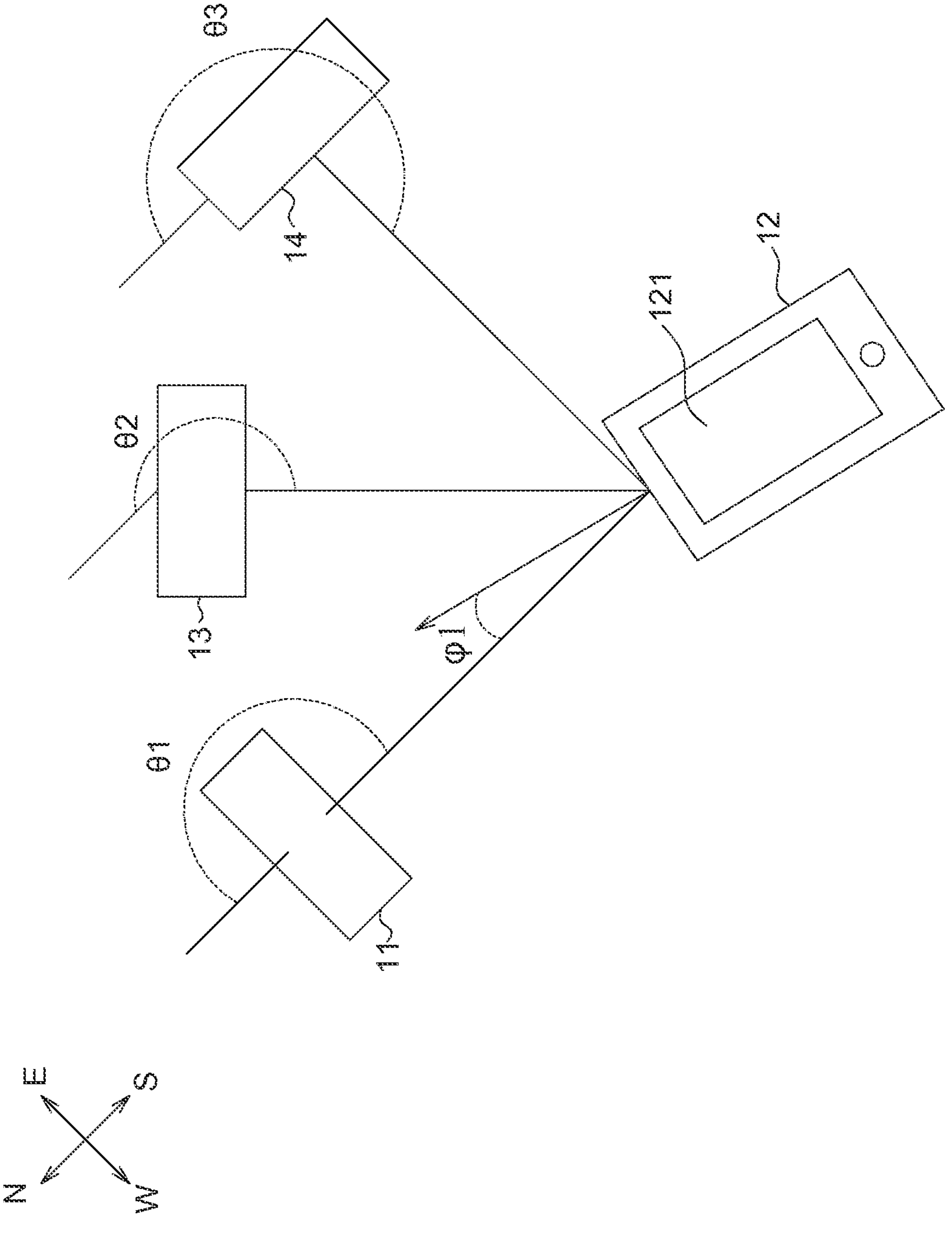
FIG. 5 is a schematic view showing a home appliance system according to a second embodiment.

FIG. 5 is a schematic view showing a home appliance system 5 according to a second embodiment. As shown in FIGS. 1, 4 and 5, the main difference between the home appliance system 5 and the home appliance system 1 resides in that the home appliance system 5 further comprises a home appliance apparatus 13 and a home appliance apparatus 14 in addition to the home appliance apparatus 11 and the handheld electronic apparatus 12. Similar to the home appliance apparatus 11, each of the home appliance apparatus 13 and the home appliance apparatus 14 has a home appliance body, an orientation sensor, a processor and a network module. The home appliance apparatus 11, the home appliance apparatus 13 and the home appliance apparatus 14 can register the home appliance orientation θ1, the home appliance orientation θ2 and the home appliance orientation θ3 on the handheld electronic apparatus 12, respectively. In addition, the home appliance apparatus 11, the home appliance apparatus 13 and the home appliance apparatus 14 also register the controllable functions thereof on the handheld electronic apparatus 12, respectively.

The processor 123 calculates the angle difference Δθ1 between the home appliance orientation θ1 and the remote control orientation ϕ1, calculates an angle difference Δθ2 between the home appliance orientation θ2 and the remote control orientation ϕ1, and calculates an angle difference Δθ3 between the home appliance orientation θ3 and the remote control orientation ϕ1. When the angle difference Δθ1 is smaller than the angle difference Δθ2 and the angle difference Δθ2 is smaller than the angle difference Δθ3, the home appliance apparatus 11 is controlled apparatus of the handheld electronic apparatus 12. In short, the processor 123 selects the home appliance apparatus with the minimum angle difference as the controlled apparatus of the handheld electronic apparatus 12.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A handheld electronic apparatus, comprising:

a network module, for receiving a broadcast packet, which is outputted from a first home appliance apparatus and comprises a first home appliance orientation and a controllable function of the first home appliance apparatus;

an orientation sensor, for providing a remote control orientation of the handheld electronic apparatus;

a touch display; and a processor, for relating the controllable function to a touch gesture of the touch display and determining whether the first home appliance apparatus is a controlled apparatus according to the first home appliance orientation and the remote control orientation, wherein when the first home appliance apparatus is the controlled apparatus and the touch display receives the touch gesture, the first home appliance apparatus is remotely controlled to execute the controllable function;

wherein the processor calculates a first angle difference between the first home appliance orientation and the remote control orientation, and the processor determines whether the first angle difference falls within a tolerance range, wherein when the first angle difference falls within the tolerance range, the first home appliance apparatus is the controlled apparatus.

2. The handheld electronic apparatus according to claim 1, further comprising:

a prompt apparatus, which further feeds back a prompt message when the first home appliance apparatus is the controlled apparatus.

3. The handheld electronic apparatus according to claim 2, wherein the prompt message is sound or vibration.

4. The handheld electronic apparatus according to claim 1, wherein the processor registers the first home appliance orientation and the controllable function according to the broadcast packet.

5. The handheld electronic apparatus according to claim 1, wherein the processor calculates a second angle difference between a second home appliance orientation of a second home appliance apparatus and the remote control orientation, and the processor determines whether the second angle difference is smaller than the first angle difference, wherein when the second angle difference is smaller than the first angle difference, the second home appliance apparatus is the controlled apparatus.

6. A remote control method, used in a handheld electronic apparatus to remotely control a first home appliance apparatus, the handheld electronic apparatus comprising a touch display, the remote control method comprising:

receiving a broadcast packet, which is outputted from the first home appliance apparatus and comprises a first home appliance orientation and a controllable function of the first home appliance apparatus;

relating the controllable function to a touch gesture of the touch display; and determining whether the first home appliance apparatus is a controlled apparatus according to the first home appliance orientation and a remote control orientation of the handheld electronic apparatus, wherein when the first home appliance apparatus is the controlled apparatus and the touch display receives the touch gesture, the first home appliance apparatus is remotely controlled to execute the controllable function;

wherein the step of determining further comprises:

calculating a first angle difference between the first home appliance orientation and the remote control orientation; and determining whether the first angle difference falls within a tolerance range, wherein when the first angle difference falls within the tolerance range, the first home appliance apparatus is the controlled apparatus.

7. The method according to claim 6, wherein when the first home appliance apparatus is the controlled apparatus, a prompt message is fed back.

8. The method according to claim 7, wherein the prompt message is sound or vibration.

9. The method according to claim 6, further comprising:

registering the first home appliance orientation and the controllable function according to the broadcast packet.

10. The method according to claim 6, wherein the step of determining further comprises:

calculating a second angle difference between a second home appliance orientation of a second home appliance apparatus and the remote control orientation; and determining whether the second angle difference is smaller than the first angle difference, wherein when the second angle difference is smaller than the first angle difference, the second home appliance apparatus is the controlled apparatus.

11. A home appliance system, comprising:

a first home appliance apparatus, which comprises:

a home appliance body having a controllable function;

a first orientation sensor, for providing a first home appliance orientation of the first home appliance apparatus;

a first processor, for generating a broadcast packet according to the controllable function and the first home appliance orientation; and a first network module, for transmitting the broadcast packet;

a handheld electronic apparatus, which comprises:

a second network module, for receiving the broadcast packet;

a second orientation sensor, for providing a remote control orientation of the handheld electronic apparatus;

a touch display; and a second processor, for relating the controllable function to a touch gesture of the touch display and determining whether the first home appliance apparatus is a controlled apparatus according to the first home appliance orientation and the remote control orientation, wherein when the first home appliance apparatus is the controlled apparatus and the touch display receives the touch gesture, the home appliance body is remotely controlled to execute the controllable function;

wherein the second processor calculates a first angle difference between the first home appliance orientation and the remote control orientation, and determines whether the first angle difference falls within a tolerance range, wherein when the first angle difference falls within the tolerance range, the first home appliance apparatus is the controlled apparatus.

12. The home appliance system according to claim 11, wherein the handheld electronic apparatus further comprises:

a prompt apparatus, which further feeds back a prompt message when the first home appliance apparatus is the controlled apparatus.

13. The home appliance system according to claim 12, wherein the prompt message is sound or vibration.

14. The home appliance system according to claim 11, wherein the second processor registers the first home appliance orientation and the controllable function according to the broadcast packet.

15. The home appliance system according to claim 11, further comprising:

a second home appliance apparatus, wherein the second processor calculates a second angle difference between a second home appliance orientation of the second home appliance apparatus and the remote control orientation, and the second processor determines whether the second angle difference is smaller than the first angle difference, wherein when the second angle difference is smaller than the first angle difference, the second home appliance apparatus is the controlled apparatus.

16. A home appliance apparatus, comprising:

a home appliance body, having a controllable function;

an orientation sensor, for providing a home appliance orientation of the home appliance apparatus;

a processor, for generating a broadcast packet according to the controllable function and the home appliance orientation; and a network module, for transmitting the broadcast packet to a handheld electronic apparatus, so that the handheld electronic apparatus remotely controls the home appliance body to execute the controllable function wherein the handheld electronic apparatus calculates a angle difference between the home appliance orientation and a remote control orientation of the handheld electronic apparatus, and the handheld electronic apparatus determines whether the angle difference falls within a tolerance range, wherein when the angle difference falls within the tolerance range, the home appliance apparatus is a controlled apparatus.

17. The home appliance apparatus according to claim 16, wherein the handheld electronic apparatus further comprises:

a prompt apparatus, which further feeds back a prompt message when the home appliance apparatus is the controlled apparatus.

18. The home appliance apparatus according to claim 17, wherein the prompt message is sound or vibration.

19. The home appliance apparatus according to claim 16, wherein the handheld electronic apparatus registers the home appliance orientation and the controllable function according to the broadcast packet.

* * * * *